United States Patent
Mekuria

(10) Patent No.: US 7,110,948 B1
(45) Date of Patent: Sep. 19, 2006

(54) METHOD AND A SYSTEM FOR VOICE DIALLING

(75) Inventor: Fisseha Mekuria, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 532 days.

(21) Appl. No.: 09/388,609

(22) Filed: Sep. 2, 1999

(30) Foreign Application Priority Data

Sep. 4, 1998 (SE) ...................... 9802990

(51) Int. Cl.
*G10L 15/08* (2006.01)

(52) U.S. Cl. ...................... 704/242; 704/275
(58) Field of Classification Search ................ 704/242, 704/251, 270, 275; 379/88.02
See application file for complete search history.

(56) References Cited

U.S. PATENT DOCUMENTS

| 4,741,037 A | 4/1988 | Goldstern |
| 4,821,211 A | 4/1989 | Torres |
| 5,386,494 A * | 1/1995 | White ........................ 704/275 |
| 5,515,475 A * | 5/1996 | Gupta et al. ................ 704/242 |
| 5,752,232 A * | 5/1998 | Basore et al. ............... 704/275 |

FOREIGN PATENT DOCUMENTS

EP          0 173 986 A2      3/1986

* cited by examiner

*Primary Examiner*—Angela Armstrong
(74) *Attorney, Agent, or Firm*—Nixon & Vanderhye P.C.

(57) ABSTRACT

In a speech recognition system of a mobile telephone the words are organized in a trellis structure. Thus, at each instant the speech recognition system only needs to search a limited part of the entire vocabulary. Such an arrangement solves the problem of having to search many words at a time, which is time consuming and imposes a high computational load on the system, and will therefore significantly increase the accuracy for the speech recognition system.

13 Claims, 2 Drawing Sheets

Acronyms, DSP : Digital signal processing.
SPE/D : Speech encoder/decoder.
ASR : Automatic speech recognition.
HFSP : Handsfree signal processing, such as acoustic echo canceling, and noise suppression.
CHE/D : Channel encoder/decoder.

METHOD AND A SYSTEM FOR VOICE DIALLING

TECHNICAL FIELD

The present invention relates to a method and a system for speech recognition, in particular for use when entering commands to a mobile telephone, such as voice dialling.

BACKGROUND OF THE INVENTION AND PRIOR ART

In speech recognition systems, the main object is to make a machine understand an utterance made by a human speaker. Thus, speech recognition is used for facilitating a man-machine interface (MMI) by means of allowing entering of commands, text and data to the machine directly from the speech.

In speech recognition, the task for the computer is to transform the acoustic input signal into a text, so called transcription. The characteristics of the input signal varies within a broad range for the same word depending on the sex, age, dialect, etc. of the speaker. Furthermore, if several words are entered into the system at the same time, for example if a whole sentence is given to the speech recognition system, the pronunciation of the different words may differ depending on the words preceding and/or succeeding a present word.

Furthermore, the presence of noise and echoing effects may distort the original signal before it enters the speech recognition system.

In general, speech recognition systems can be divided into two main groups:
  i) Speaker independent systems and
  ii) Speaker dependent systems Speaker independent systems, in particular those designed for a large vocabulary and for accepting speech without pausing between the different words, i.e. sentences or parts thereof, requires the use of large speech data bases and use different statistical properties of speech and words. Grammatical rules and predictions of what is likely to be said can also be incorporated in such systems.

Speaker dependent systems, on the other hand, and in particular those using a limited vocabulary (typically a few hundred words) and where only one word is spoken at the time, does not require any large data bases. Instead such systems requires training of the particular speaker, or, in some cases speakers, using the system.

A speaker dependent speech recognition system will of course provide a much better performance compared to a speaker independent system for a number of reasons. For example, the number of words is limited and also the system has an exact knowledge of how a particular word should sound, since it has been trained by the particular person using the system.

However, a speaker dependent system can only be used for a limited range of applications. An application, in which a speaker dependent system is to prefer to a speaker independent system is for example entering of commands to a machine.

In such a case the task for the speech recognition system is to transcript the command given orally into a form which can be understood by the machine, i.e. usually a binary word, which is used for controlling the machine. For example, commands such as "Go", "Stop", "Left", "Right" "Yes", "No", etc. can be given orally to a machine, which then executes the corresponding actions.

Nevertheless, even though the number of possible words that the machine has to recognise is limited, typically to a few hundred words, and even though the speech recognition system of the machine has been trained by the voice of the user and therefore has an exact knowledge of how a particular word sounds when spoken by that particular user, a number of possible sources for making a wrong decision still exists.

Thus, noise and echoing effects in the environment will distort the signal entering the speech recognition system. Also, the frequency spectrum of the same word will experience small variations from time to time, and in particular if the speaker has a cold or the like.

Another problem is that the number of words, even though limited to, typically a few hundred, requires a very large amount of processing power. In a typical speech recognition system the sampling rate is 8000 samples per second and where each sample consists of about 13 bits. This results in that a typical word, which typically lasts for a second, consists of about 100 000 bits.

Thus, in a system where real time constrains exists, for example requiring a response time of 1 second or less, the speech recognition system has to be able to process the large amount of information contained in each word very quickly.

Furthermore, the computational load on the system increases heavily when the number of words increases. This is due to a number of different reasons. Thus, the system has to search a greater number of words when trying to determine which word or command has been spoken. Also, when the number of words/commands increases the risque for that a given command has characteristics which resembles another command increases. In order to avoid a faulty decision the system then has to extract more features from the different words in order to make a correct decision with a required probability. Finally, the possibility that the system interprets a non-existing command word as a command increases if the number of word increases, i.e. the performance of the out of vocabulary rejection (OVR) function decreases.

In a system, which is designed to operate under difficult conditions, such as a mobile telephone comprising a voice controlled dialling system (VCD), i.e. having means for receiving commands orally, and which may be used in a car, the accuracy of existing speech recognition systems is in most cases too low.

A system using speech recognition for entering commands is described in U.S. Pat. No. 5,386,494. The system as described in U.S. Pat. No. 5,386,494 displays a number of different icons on a screen. By selecting a certain icon a user can limit the possible commands to the commands associated with the selected icon shown on the screen. However, it is difficult to use such a system in a mobile telephone, which usually lacks a suitable graphical display.

Also, U.S. Pat. No. 5,515,475 describes a speech recognition system designed to build word models starting from phonemes or allophones.

SUMMARY

It is an object of the present invention to overcome some of the problems associated with the prior art and to provide a method and a system in a mobile telephone, having an improved accuracy and which can be used in an environment having echoing effects and which is noisy.

This object and others are obtain by a speech recognition system having its vocabulary arranged in a trellis structure in the mobile telephone. At each instant only a part of the whole vocabulary of the speech recognition system is searched for a match, depending on where in the trellis structure the speech recognition system is set to search at a particular time. The trellis structure of the vocabulary can preferably be traversed in any suitable way so that, when a certain command is to be given to the system, the system at that time searches the correct part of the vocabulary.

Such an arrangement solves the problem of having to search many words at a time and will significantly increase the accuracy for the speech recognition system, in particular when the speech recognition system is used in a noisy environment and the risque for a wrong decision is thereby reduced. Also, in order for the mobile telephone to make up for the lack of a graphical interface, the mobile telephone can be provided with a voice prompter which guides the user through the threllis structure of the vocabulary.

BRIEF DESCRIPTION OF THE DRAWINGS

The present invention will now-be described in more detail by way of non-limiting examples and with reference to the accompanying drawings, in which.

DESCRIPTION OF PREFERRED EMBODIMENTS

Figure 1:
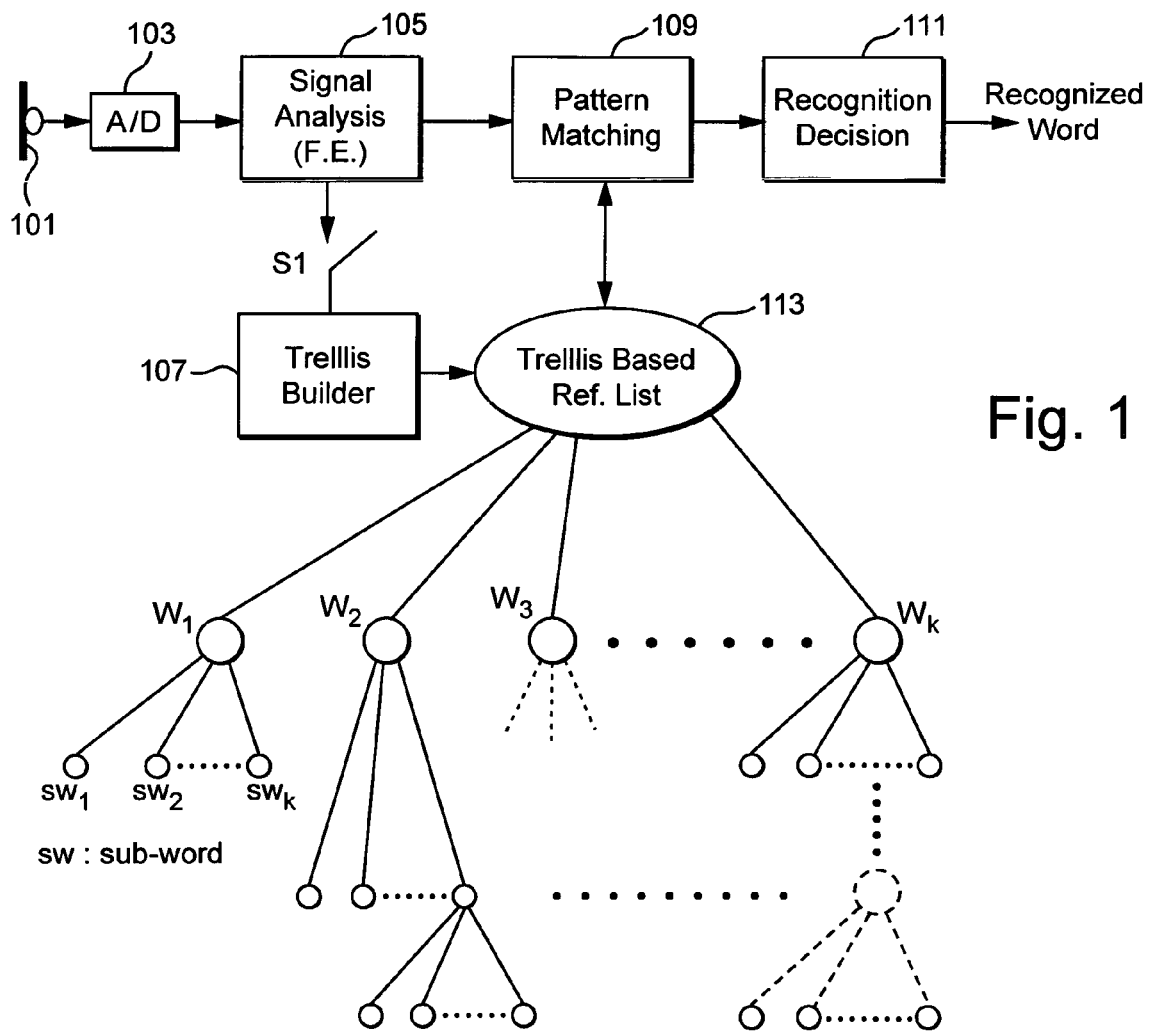
FIG. 1 is a general block diagram of a speech recognition system.

In FIG. 1 a general block diagram of a speech recognition system is shown. The system comprises an input terminal 101 connected to an A/D converter 103, which is connected to a signal analysis block 105. The signal analysis block 105 is connected to a block 107 for generating a trellis and to a word recognition block 109. The block 109 is connected to a block 111 for making a decision and which outputs the recognized word. The block 109 is also connected to a vocabulary 113 stored in the speech recognition system, which will be described more in detail below. The vocabulary 113 is also connected to the block 107.

Thus, an audio signal enters the system at the input terminal 101. The analogue audio signal is then converted to a corresponding digital signal in the block 103, for example at a sampling frequency of 8 kHz into digital signal having, for example, 13 bits/sample.

Next, in the block 105 conventional signal analysis of the digitized signal is carried out. The signal analysis may involve feature extraction and other conventional operations such as filtering. The output signal from the block 105 is fed to the block 109 in which the signal is compared with the words stored in the vocabulary 113. The method by means of which the comparison is carried out can be any conventional method, such as pattern recognition or Markov Models.

In the vocabulary the words are arranged in a trellis structure. Thus, at each instant only a part of the whole vocabulary of the speech recognition system is searched for a match. The trellis structure of the vocabulary can be traversed in any suitable way, such as in a tree structure, so that, when a certain command is to be given to the system, the system at that time searches the correct part of the vocabulary. This will solve the problem of having to search many words at a time and will therefore significantly increase the accuracy for the speech recognition system, in particular when the speech recognition system is used in a noisy environment and the risque for a wrong decision is thereby reduced.

In a preferred embodiment the words of the vocabulary are divided into different classes, which in turn can be divided in sub-classes, and so on, as shown in FIG. 1. Thus, first the speaker operating the system selects the class of words he want to be recognized by the system by means of entering a word corresponding to that class to the speech recognition system. Next, the speaker enters the command word corresponding to the command the speaker wishes to give to the computer system receiving commands from the speech recognition system. If the command word the speaker wishes to enter to the system is located under a sub-class of the class he must, of course, first enter the word corresponding to that particular sub-class.

The entering of commands if preferably assisted by the speech recognition system, for example by means of a voice prompter as described in detail below in conjunction with FIG. 2.

The trellis structure of the vocabulary is advantageous because it significantly reduces the number of word, which the speech recognition system has to search for each entered word or utterance. This improves the accuracy for the speech recognition system, in particular when the speech recognition system is used in a noisy environment and therefore reduces the risque for a wrong decision.

The words in the vocabulary must be entered into the speech recognition system by means of training it. Therefore, when a new word is to be entered into the vocabulary the system is switched into a training mode. This is done by operating the switch S1 between the block 105 and 107.

Thus, when the switch S1 is closed the system is in a training mode. In the training mode conventional training of the system can be carried out. In addition the user of the system can place each word which the system is trained with at any location which he finds suitable in a trellis structure. He can also add classes and sub-classes move words from one location to another or erase words, sub-classes or classes. These operations are preferably assisted by a voice prompter, which can use a speech encoder provided in the system as described below in conjunction with FIG. 3.

In another preferred embodiment the system automatically generates new classes or sub-classes, when the number of words at a particular location in the vocabulary is higher than a certain pre-set threshold value. A suitable threshold value can be somewhere in the range 20–50 words.

An application when the speech recognition system as described herein can be useful is when the speech recognition system is integrated in a mobile phone. In such a case the user of the mobile phone may wish to enter a certain telephone number or wishes that the mobile phone calls a person entered in the phone book of the mobile phone. The vocabulary may then comprise a number of different classes generated during training of the speech recognition system.

Figure 2:
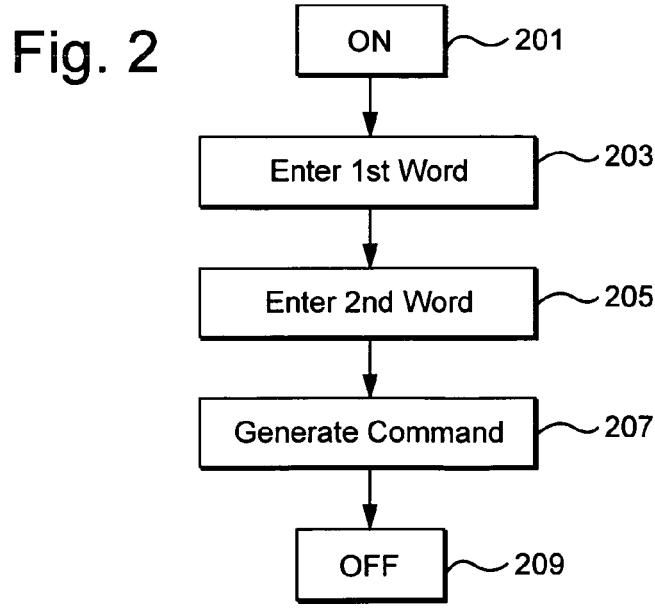
FIG. 2 is a flow chart illustrating different steps when using a speech recognition system.

In FIG. 2 a flow chart illustrating steps carried out when entering a command to a speech recognition system incorporated into a mobile telephone is shown. Thus, first the speech recognition system of the telephone is switched on in a block 201. Thereupon the speech recognition system waits for the entering of one of the words at the top level of the trellis structure of the vocabulary corresponding to a telephone number, which the user wishes to connect to.

In a preferred embodiment the entering of words can be assisted by a voice propter. Thus if a certain word is entered such as "options" the voice prompter generates all options available at the current position of the trellis. Thus, in this example, when the speech recognition system is incorporated in a telephone and the system is at the top level of the trellis, a typical set of available options could be sub-classes such as "friends", "office" and "family" and also words associated with frequently used numbers and also important numbers can be present at this level, for example "SOS".

If the word corresponding to one of the sub-classes is entered as shown in block 203 the speech recognition system changes position in the trellis structure of the vocabulary. Thus, new options will be available. If, for example, the word "office" is given to the speech recognition systems a first word in the block 203, the sub-words located under the menu "office" will be searched by the speech recognition system when a new word is entered into the speech recognition system. At the same time the voice propter preferably generates "office" as a confirmation to the user that the speech recognition system has interpreted the word correctly.

Again, if the user wants to know his options he enters "options" and the speech recognition system repeats the options available at this position in the trellis structure of the vocabulary, for example "boss", "secretary" and "up", where "up" corresponds to going up a level in the trellis structure. Other options which may be available are sub-classes at the same level in the trellis, i.e. "friends" and "family" in this case.

If the user enters "secretary" as a second word in a block 205 this word corresponds to a command, in this example a telephone number in the telephone book of the telephone, which the user wants the system to carry out. In a preferred embodiment the voice prompter the repeats "call secretary" and if the user then enters "yes" a command is generated in a block 207 so that the telephone number corresponding to the word secretary in the telephone book is connected to by the telephone and the speech recognition system is switched off as indicated by block 209.

Figure 3:
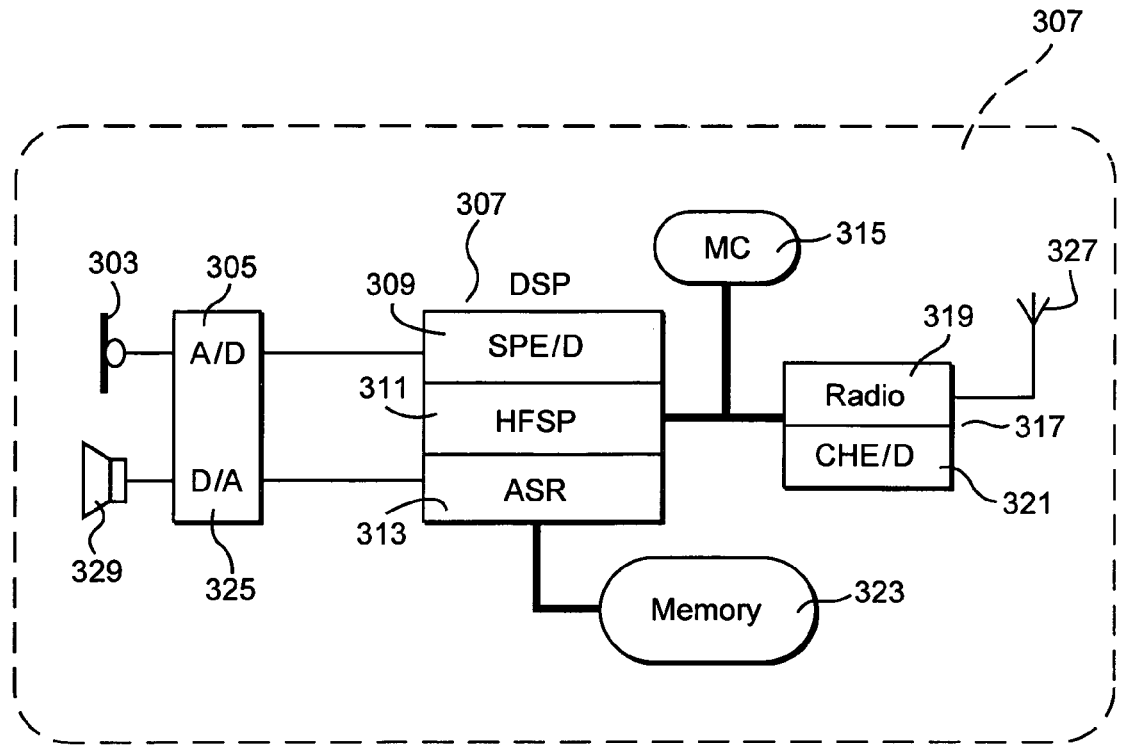
FIG. 3 is a block diagram of a mobile telephone comprising a speech recognition system.

In FIG. 3, a block diagram of a mobile telephone 301 comprising a speech recognition system as described above in conjunction with FIG. 1, is shown. Thus, the mobile telephone 301 has input means 303, which can be a microphone of conventional type connected to an A/D converter 305. The output terminal of the A/D converter 305 is connected to a digital signal processing (DSP) block 307 comprising a speech encoder/decoder (SPE/D) 309 a hands-free signal processing (HFSP) block 311 and an automatic speech recognition (ASR) block 313.

The DSP block 307 is also connected to a micro control (MC) unit 315, to a radio transmission unit 317, comprising a radio transmitter/receiver block 319 and a channel encoder/decoder block 321, to a memory 323 and to a D/A converter 325. The micro control unit 315 handles all information flow inside the mobile telephone and is set to control the DSP 307 and the radio transmitter/receiver block 319.

The micro control unit 315 is thus also connected to the radio transmission unit 317, which in turn is connected to an antenna 327. The output terminal of the D/A converter 325 is connected to output means 329, such as a loudspeaker of conventional type.

The mobile telephone can then be operated in the manner described above in conjunction with FIG. 2. When switched on the MC unit can automatically set the mobile phone in a mode allowing oral input of commands, and to output instructions via a voice prompter as described above using the speech encoder 309, the D/A converter 325 and the output terminal 329, if required.

Next, when the command(s) has/have been given, MC unit switches off the speech recognition system (ASR) and transmits the telephone number corresponding to the given command via the unit 317 and the antenna 327.

Thereupon, the telephone call is set up using conventional methods and the DSP 307 is set to perform conventional processing, such as acoustic echo cancelling, noise suppression and code the speech efficiently. When the call is terminated the MC unit 315 can again set the DSP unit to receive commands given orally.

The speech recognition system for a mobile telephone as described herein has many advantages compared to previously known voice dialling systems. Thus, many words can be stored in the vocabulary and the voice dialling function of the mobile telephone can still operate correctly, even in a noisy environment. This is thanks to the trellis structure of the vocabulary. The trellis structure of the vocabulary is independent of the speech recognition algorithm used. The performance of the out of vocabulary rejection (OVR) function will also increase when using the system as described herein, since the number of possible entered words is kept to a minimum.

The invention claimed is:

1. A speech recognition system in a mobile telephone, the speech recognition system comprising:
   a stored vocabulary, wherein words in the vocabulary are arranged in a trellis structure comprising a plurality of different groups of words, and
   a word group selection system for enabling a user to speak via voice commands to select at least a first of said plurality of different groups of words, said first group of words being selected based upon at least a word spoken by the user, so that a limited number of groups of the entire vocabulary, less than said plurality, is searched for a word during subsequent speech recognition processes in the mobile telephone after selection of at least the first of said plurality of groups of words.

2. A system according to claim 1, characterized in that the vocabulary is arranged in a tree structure.

3. A system according to claim 1, characterized by
   means for outputting the words that the system is set to recognize at a particular moment.

4. A system according to claim 3, characterized in that said means is a voice prompter.

5. A system according to claim 1, characterized by
   means for automatically generating a new group if the number of words in one group exceeds a certain, pre-set threshold value.

6. A method of speech recognition comprising:
   providing a speech recognition system of a mobile telephone comprising a stored vocabulary, wherein the words in the stored vocabulary are arranged in a trellis structure comprising a plurality of different groups of words,
   providing a word group selection system for enabling a user to speak via voice commands to select at least a first of said plurality of different groups of words, said first group of words being selected based upon at least a word spoken by the user, so that only one group or a limited number of groups of the entire vocabulary less than said plurality is searched for a word during certain subsequent speech recognition processes in the mobile telephone after selection of at least the first of said plurality of groups of words.

7. A method according to claim 6, characterized in that the vocabulary is arranged in a tree structure.

8. A method according to claim 6, characterized in that the available words that the system is set to recognize at a particular moment is output from the system.

9. A method according to claim 8, characterized in that the available words are generated by a voice prompter.

10. A method according to claim 6, characterized in that a new group automatically is generated if the number of words in one group exceeds a certain, pre-set threshold value.

11. The speech recognition system of claim 1, further comprising an automatic word group generation system for automatically generating new groups of words for storage in said vocabulary when a number of words in or at a particular location in the vocabulary exceeds a predetermined threshold value.

12. A speech recognition system in a mobile telephone, the speech recognition system comprising:
   means for storing a word vocabulary in trellis tree structure, wherein words in the vocabulary are arranged in a plurality of different groups of words,
   word group selection means for enabling a user to speak via voice commands into the mobile telephone to select a first of said plurality of different groups of words, said first group of words being selected based upon at least a word spoken by the user, and
   speech recognition means for comparing input speech from a user to words in said selected first group of words, so that comparing of the input speech is performed relative to said selected first group of words prior to comparing the input speech with other of the plurality of different groups of words so that a limited number of groups of the entire vocabulary is searched via said comparing during speech recognition processes.

13. The speech recognition system of claim 12, further comprising automatic word group generation means for automatically generating new groups of words for storage in said vocabulary when a number of words in or at a particular location in the vocabulary exceeds a predetermined threshold value.

* * * * *